United States Patent
Seni et al.

(10) Patent No.: US 6,285,786 B1
(45) Date of Patent: Sep. 4, 2001

(54) TEXT RECOGNIZER AND METHOD USING NON-CUMULATIVE CHARACTER SCORING IN A FORWARD SEARCH

(75) Inventors: Giovanni Seni, Mountain View; John Seybold, Palo Alto, both of CA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/070,316

(22) Filed: Apr. 30, 1998

(51) Int. Cl.[7] ................................................. G06K 9/00
(52) U.S. Cl. .................................................. 382/187
(58) Field of Search .............................. 382/181, 182, 382/183, 184, 185, 186, 187, 188, 189, 190, 191, 193, 195, 199, 203, 206, 209

(56) References Cited

U.S. PATENT DOCUMENTS

| | | | |
|---|---|---|---|
| 4,495,644 | * | 1/1985 | Parks et al. ................................ 382/3 |
| 5,687,254 | * | 11/1997 | Poon et al. ............................ 382/229 |
| 5,710,916 | * | 1/1998 | Barbara et al. ....................... 395/609 |
| 5,757,959 | * | 5/1998 | Lopresti ................................. 382/186 |

OTHER PUBLICATIONS

R. Haeb–Umbach and H. Ney, "Improvements in time–synchronous beam search for 1000–word continuous speech recognition", IEEE Trans. Speech and Audio Processing, vol. 2, pp. 353–356, 1994.

J.J. Odell, V. Valtchev, P.C. Woodland, S.J. Young, "A One Pass Decoder Design for Large Vocabulary Recognition", Proc. Human Language Technology Workshop, Plainsboro, NJ, Mar. 1994.

L.R. Bahl, F. Jelinek and R.L. Mercer, "A Maximum Likelihood Approach to Continuous Speech Recognition", IEEE Trans. On Pattern Analysis and Machine Intelligence, pp. 179–190, 1983.

J. Makhoul, T. Starner, R. Schwartz and G. Chou, "On–Line Cursive Handwriting Recognition Using Hidden Markov Models and Statistical Grammars", IEEE Conf. on Acoustics, Speech and Signal Processing, Australia, 1994.

M. Schenkel, I. Guyon and D. Henderson, "On–line Cursive Script Recognition Using Time–delay Neural Networks and Hidden Markov Models", IEEE Conf. on Acoustics, Speech and Signal Processing, Australia, 1994.

S. Manke, M. Finke and A. Waibel, "A Fast Search Technique for Large Vocabulary On–line Handwriting Recognition", Fifth International Workshop on Frontiers in Handwriting Recognition (IWFHR5), England, 1996.

D.E. Rumelhart, "Theory to Practice: A Cast Study—Recognizing Cursive Handwriting", Third NEC Symposium on Computational Learning and Cognition, New Jersey, 1992.

\* cited by examiner

*Primary Examiner*—Andrew W. Johns
*Assistant Examiner*—Seyed Azarian
(74) *Attorney, Agent, or Firm*—Romi N. Bose; Hisashi D. Watanabe

(57) ABSTRACT

In a method of recognition of handwritten input, a preprocessing module (200) of a recognizer (203) having a recognition module (202), segments handwritten input into strokes, to provide stroke vectors. A search module (204) generates hypothetical character strings for scoring by the recognition module (202). A character hypothesis is generated which is a data set of a character, a start vector and an end vector. The recognizer (203) provides a non-cumulative score for the character hypothesis, where the score represents a likelihood of the character being present in the handwritten input at a position starting at the start vector and ending at the end vector. The recognizer (203) delivers to the search module a result that is either the score for the selected first character hypothesis or a result that allows the search module to temporarily ignore the hypothesis or to kill it altogether. The search module maintains or disregards the first hypothetical character string dependent on the result. The process is repeated for other character hypotheses and other hypothetical character strings.

18 Claims, 6 Drawing Sheets

TEXT RECOGNIZER AND METHOD USING NON-CUMULATIVE CHARACTER SCORING IN A FORWARD SEARCH

FIELD OF THE INVENTION

This invention relates to a text recognizer and a method of recognition of handwritten input, for example for use in a user interface for a computer or other data device.

BACKGROUND OF THE INVENTION

Research in speech and handwriting recognition—the translation of a person's voice or writing into computer readable text has been ongoing since at least the 1960's. The two problems share many common characteristics: processing of a signal with inherent temporal structure, recognition of a well-defined and finite set of symbols (i.e., characters and phonemes), composition of these basic symbols to form words and phrases, and presence of the co-articulation effect. Because of these similarities, techniques developed to solve one problem can often be applied to the other.

In an existing speech recognizer, an unknown waveform is converted by a front-end signal processor into a sequence of acoustic vectors, $Y = y_1, y_2, \ldots, y_T$. Each of these vectors is a compact representation of the short-time speech spectrum covering a uniform period of typically 10 milliseconds. With this input representation, the job of the recognition system is formulated as that of determining the most probable word, or word sequence, $W^*$ given the observed vector sequence $Y$. That is, $$\text{Find } W^* \text{ such that } W^* = \underset{W}{\operatorname{argmax}} \ P(W \mid Y) \quad (1)$$

The naive way of finding $W^*$ is to enumerate all possible word sequences and compute $P(W|Y)$ for each of them. This approach is impractical when the number of possible words is large. Instead, potential word sequences are explored in parallel (i.e., in a breadth-first fashion), discarding hypotheses as soon as they become improbable. This search process is referred to in the speech literature as the "beam search". See, for example: R. Haeb-Umbach and H. Ney, "Improvements in time-synchronous beam search for 1000-word continuous speech recognition", IEEE Trans. Speech and Audio Processing, Vol 2, pp 353–356, 1994; or J. J. Odell, V. Valtchev, P. C. Woodland, S. J. Young, "A one pass decoder design for large vocabulary recognition" Proc. Human Language Technology Workshop, Plainsboro, N.J., March, 1994.

To further understand the search process, let $D = \{W_1, W_2, \ldots, W_K\}$ be a dictionary consisting of the K words known to the system. Each of these words $W_i$ is represented as a sequence of phone models $W_i = C_{i_1} C_{i_2} \ldots C_{i_L}$ corresponding to its pronunciation (in handwriting recognition there are character models instead). The dictionary is represented in a tree-based structure: at the start there is a branch to every possible start model $C_{j_1}$; all first models are then connected to all possible follow models $C_{j_2}$ and so on. The tree is extended deep enough until all words in D are represented. Word sequences are represented in a compact way by allowing the tree to be reentrant: it is possible to have a path from the start node to some point in the tree corresponding to an end of word, and continuing at the start of the tree again.

The dictionary tree is used by the search to generate a set of initial hypotheses or theories. At each time step, the observed input $y_t$ is compared against the set of open theories, and a probability of each theory generating the input is multiplied into the theory's ongoing score. At any time, a theory is a product of n probabilities, one for each time step. The theories can be directly compared, and some subset may be selected for further evaluation. Each theory has the possibility of propagating to generate a set of new theories that encode possible completions of the utterance from the current point in time. By carefully controlling the rate of new theory propagation and the destruction of obsolete theories, the exponential growth of the search space can be controlled. In particular, the standard formulation of the search algorithm follows a score-prune-propagate pattern, in which theories are scored, poorly scoring theories are destroyed, and then a subset of the survivors are allowed to propagate.

Probabilities are generated using an HMM representation of each phone model, for example as described in L. R. Bahl, F. Jelinek and R. L. Mercer, "A maximum likelihood approach to continuous speech recognition", IEEE Trans. On Pattern Analysis and Machine Intelligence, pp 179–190, 1983. Phonetic HMMs are finite-state machines with a simple left-right topology, and typically, three emitting states. An HMM changes states once every time unit, and every time that a state, $q_j$, is entered, an acoustic vector, $y_t$, is produced as output with probability density $b_{q_j}(y_t)$. In addition, the transition from state $q_i$ to state $q_j$ is also probabilistic and governed by the discrete probability $a_{q_i q_j}$ (see FIG. 1).

FIG. 1 shows a 3 state phoneme model. It is shown connected on the left and right to other models. Associated with each state $q_i$ there is an "emission" probability distribution $b_{q_i}(y_t)$ and associated with each arc $(q_i, q_j)$ there is a "transition" probability $a_{q_i q_j}$.

The problem of computing $P(W|Y)$ in (1) is simplified by using Bayes' rule which expresses this probability as $$P(W \mid Y) = \frac{P(W) P(Y \mid W)}{P(Y)} \quad (2)$$

In Eq. (2), $P(W)$ corresponds to the a priori probability of observing W in the language or application of interest, and thus this probability is determined by a language model. $P(Y|W)$ represents the probability of observing the vector sequence Y given some specified word sequence W. Alternatively, $P(Y|W)$ is a measure of similarity between a model for W and the unknown speech Y. A model for W is constructed by concatenating word models which, in turn, are composed of concatenated phonetic HMM models. Note that $P(Y)$ may be neglected (during recognition) since it has no effect on the chosen word sequence.

The required probability $P(Y|W)$ can be computed by summing over all possible state sequences of length T, $Q = q_0 \ldots q_T$, through the states of the given model:

$$P(Y \mid W) = \sum_Q P(Y, Q \mid W) \quad (3)$$

$$= \sum_Q \prod_{t=1}^T b_{q_t}(y_t) \cdot a_{q_{t-1} q_t}$$

For computational efficiency, $P(Y|W)$ is often approximated by finding the sequence of states most likely to have generated the given observations Y, without having to search all possible sequences:

$$P(Y \mid W) \sim \underset{Q}{\operatorname{Max}} P(Y, Q \mid W) \qquad (4)$$

$$= \underset{Q}{\operatorname{Max}} \prod_{t=1}^{T} b_{q_t}(y_t) \cdot a_{q_{t-1} q_t}$$

Efforts to apply this framework to the problem of handwriting recognition have focused on formulating input representation schemes that view the handwriting process as a function of a single independent variable, such as time or one dimensional positioning. In existing handwriting recognition schemes, the pen trajectory $\{(X(t),Y(t)\}$ is transformed into a continuous-time feature vector sequence $F=f_1, f_2, \ldots, f_t$ where each vector $f_t$ encodes local information (e.g., writing direction and curvature) for a data point $P(t)=(X(t),Y(t))$. Reference can be made, for example to J. Makhoul, T. Starner, R. Schwartz and G. Chou, "On-line cursive handwriting recognition using hidden markov models and statistical grammars", IEEE Conf. on Acoustics, Speech and Signal Processing, Australia, 1994; M. Schenkel, I. Guyon and D. Henderson, "On-line cursive script recognition using time-delay neural networks and hidden markov models", IEEE Conf. on Acoustics, Speech and Signal Processing, Australia, 1994; or S. Manke, M. Finke and A. Waibel, "A fast search technique for large vocabulary on-line handwriting recognition", Fifth International Workshop on Frontiers in Handwriting Recognition (IWFHR5), England, 1996.

With this kind of representation, these systems were able to preserve, with almost no modification, the HMM and tree structured forward search architecture described above. However, many of the more efficient character recognizers in handwriting recognition research do not provide scores which meet the operational requirements of forward search methods—namely, that every character hypothesis be able to be scored at every point in time, and that character scores accumulate monotonically as the search proceeds. If these constraints aren't met, the forward search algorithm can no longer prune theories based on their scores.

Non-cumulative character scores mean that scores can fluctuate dramatically, as the character theory spans an ever-larger region of the ink. At some point, if the theory is correct, it should include exactly the correct amount of ink for the character it proposes, at which point it should score well. Before and after this point, it will either not score at all, or will score (hopefully) poorly. This is illustrated in FIG. 2, which is a sketch showing scores for different "points" or "depths" of ink—i.e. scores for a given character at a given start vector and different end vectors. The sketch of FIG. 2 contrasts with a cumulative score illustrated in FIG. 3, in which a score at a given point (vector) is a multiple or fraction of the score at the preceding point.

It follows from this point that once a theory has been created, there is no choice but to live with it until it expires. Partly this is because it is not known when the theory will span the correct ink and get a good score (as shown in FIG. 2) and partly because if not all of the theories score at a given time, there is no way of comparing theories and discarding those which score poorly. It would seem that being unable to prune low scoring theories would lead to a terrible explosion of the search space, and in fact this can happen if steps are not taken to control the growth of the theory set.

If, once a theory has been created, it has to be maintained until it is certain that the theory can be destroyed, there are two significant conclusions. First, there must be a mechanism to determine when a theory can safely be destroyed because it can no longer score well; second, there must be a conservative process for creating theories and avoiding creating those which are unlikely to score well.

SUMMARY OF THE INVENTION

According to the invention, a text recognizer is provided comprising a non-cumulative character recognition module coupled to a forward search module, such as a beam or Viterbi search module.

According to a further aspect of the present invention, a method of recognition of handwritten input is provided, comprising: segmenting the handwritten input into strokes in a preprocessing module, to provide stroke vectors; creating a first hypothetical character string in a search module; creating a first character hypothesis in a search module, the first character hypothesis being a first data set comprising a first character, a first start vector and a first end vector, where in the first character is a member of the first hypothetical character string; requesting, from the search module to a character recognition module a non-cumulative score for the first character hypothesis, where the score represents a likelihood of the first character being present in the handwritten input at a position starting at the start vector and ending at the end vector; delivering from the character recognition module to the search module a score for the selected first character hypothesis; and selectively maintaining (or disregarding) the first hypothetical character string dependent on the score.

By segmenting the handwritten input into strokes, the raw ink from the digitizer is preprocessed into a smaller number of features, providing a more manageable number of vectors upon which the beam search may operate. This substantially reduces the amount of processing required to perform handwritten recognition.

In the novel method, a non-cumulative score is delivered from the character recognition module to the search module. A non-cumulative score is a score which does not accumulate from a vector to vector. Rather than providing a score for a given vector and accumulating that score with scores for previous vectors, a non-cumulative score is provided for a range of vectors starting at a start vector and ending at an end vector. This provides an indication of the likelihood that a given character is present in the handwritten input at a position starting at the start vector and ending at the end vector. Multiple parallel non-cumulative scores are preferably delivered from the character recognition module to the search module (upon request from the search module) for a given character at different positions in the ink stream (starting at different selectable start vectors and ending at different selectable end vectors). In this manner, a number of parallel hypotheses about the identity of the input ink may be explored.

To keep the number of parallel hypotheses that need to be explored down to a manageable number, several preferred aspects of the invention are presented.

According to one preferred aspect of the invention, the character recognition module has means for delivering a first out-of-range message to the forward search module indicative of an inability to score a character theory in response to a request from the search module defining a theory which encompasses insufficient electronic ink for a character recognition operation to be completed. The search module preferably has means for temporarily skipping further evaluation of the selected theory in response to receipt of the first out-of-range message.

According to another preferred aspect of the invention, the character recognition module has means for delivering a second out-of-range message to the search module in response to a request from the search module defining a selected character theory that encompasses an amount of electronic ink that is in excess of a predetermined limit for the selected character theory. Preferably the search module has means for pruning the selected theory in response to receipt of the second out-of-range message.

According to a third preferred aspect of the invention, the character recognition module has means for receiving a request from the search module, including a value indicative of a position in an ink stream, means for computing probabilities for a plurality of characters in the ink stream forward of that position and means for delivering to the search module a look-ahead value equivalent to the maximum of those probabilities. The search module preferably has decision means, responsive to the look-ahead value from the character recognition module, for deciding whether to propagate a new theory.

According to a fourth preferred aspect of the invention, the character recognition module has means for receiving a request from the search module, including a value indicative of a position in an ink stream, and the recognition module has means for providing to the search module an invalid character list, indicating characters rendered invalid by virtue of a property of the position in the ink stream. The search module preferably has means for temporarily skipping further evaluation of all theories associated with characters of the received invalid character list.

Further aspects, embodiments, and advantages of the invention are apparent from the following detailed description of the drawings.

A preferred embodiment of the invention is now described, by way of example only, with reference to the drawings.

DETAILED DESCRIPTION OF THE DRAWINGS

Figure 1:
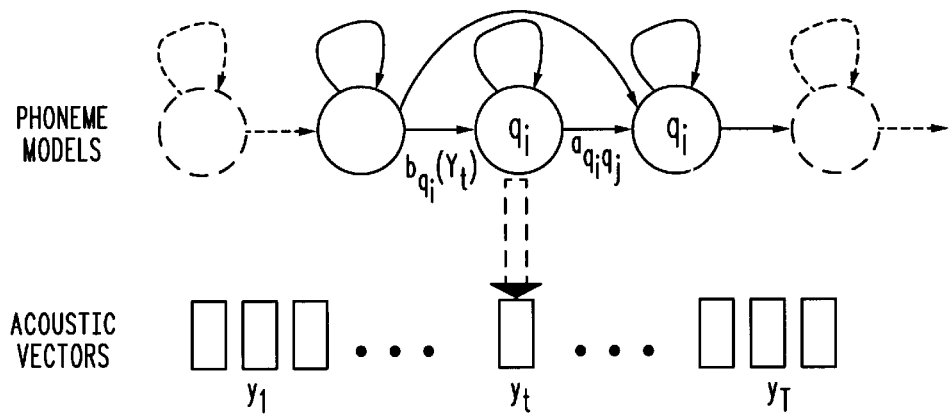
FIG. 1 is an illustration of a 3-state phoneme model used in a prior art speech recognizer.
Figure 2:
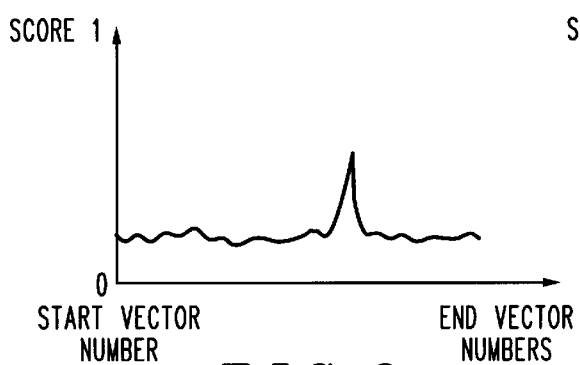
FIG. 2 and FIG. 3 are example sketches of scores for a non-accumulating recognizer and an accumulating recognizer respectively.
Figure 3:
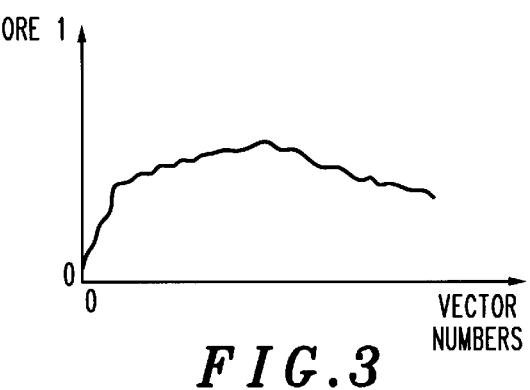
Figure 4:
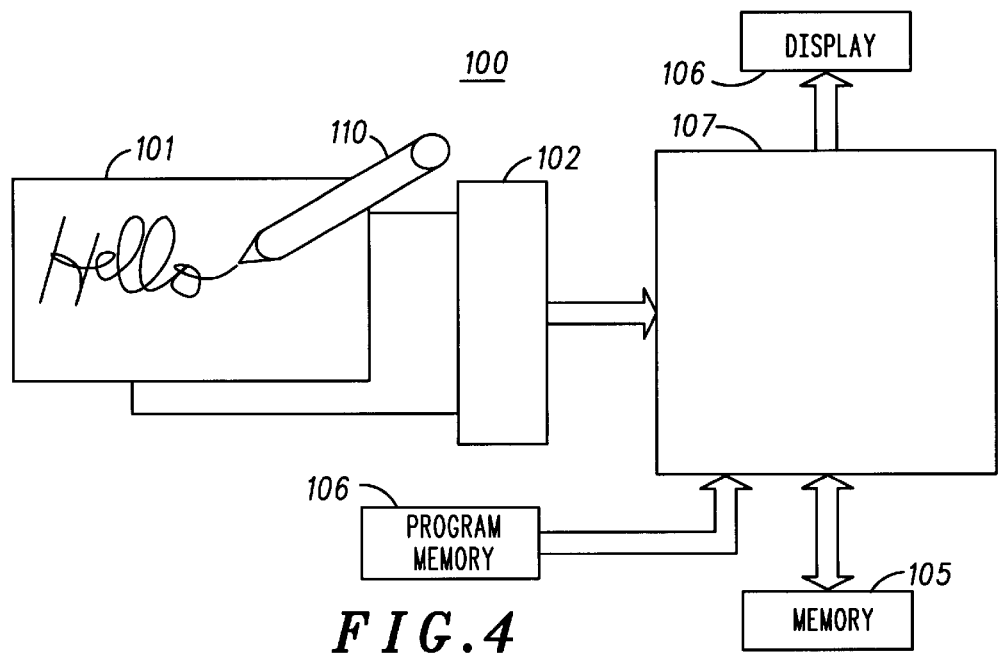
FIG. 4 is a block diagram illustrating a handwriting recognizer in accordance with the invention.

Referring to FIG. 4, a handwriting recognizer 100 is shown, comprising a digitizer 101 connected to an interface 102, which is connected to a general purpose processor, microprocessor, application-specific integrated circuit (ASIC) or other processor 103. Coupled to the processor 103 are a display 104, a memory 105 (for example a read-only memory) and a program memory 106.

In operation, words and characters (as well as punctuation, digits and other symbols and gestures) are entered into the digitizer 101 using a stylus or pen 110. A point traced on the digitizer 101 by the stylus 110 is converted into X and Y coordinates and passed by the interfaced 102 to the processor 103. The processor 103 performs handwriting recognition, aided by dictionary words stored in the memory 105, and the results of the handwriting recognition are displayed on display 104. The stylus 110 may be used to edit the results, or a keyboard may be provided (not shown) to edit the results, these features being well known in the art. The software required for performing the handwriting recognition process may be stored in a program memory 106 for loading into the processor 103. This software is now described in more detail.

Figure 5:
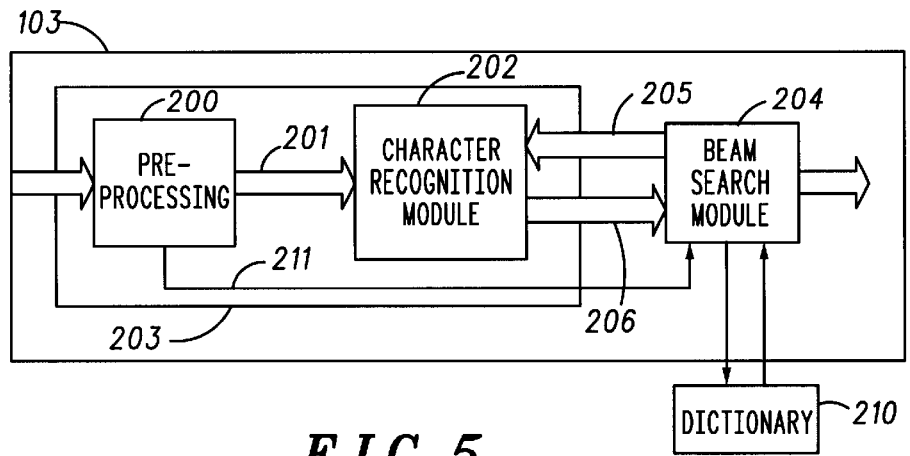
FIG. 5 illustrates software modules of the processor of FIG. 4.

Referring to FIG. 5, the handwriting recognition software stored in program memory 106, when loaded into processor 103, causes the processor 103 to comprise a preprocessing module 200, a character recognition module 202 and a beam search module 204. The preprocessing module 200 and the character recognition module 202 can together be referred to as a recognizer 203. An output 201 from the preprocessing module 200 delivers stroke vectors from the pre-processing module to the character recognition module 202. A query connection 205 connects the beam search module 204 to the character recognition module 202. A response connection 206 is connected from the character recognition module 202 to the beam search module 204. The connections 205 and 206 are capable of carrying other commands and responses as are described in greater detail below. A dictionary 210 is coupled to the beam search module 204. The dictionary 210 is preferably located in memory 105. The memory 105 may be a read-only memory, or a random access memory. The dictionary 210 may be loaded into random access memory in the processor 103 from the program memory 106. In operation, the preprocessing module 200 segments the X and Y coordinate data (referred to as the electronic 'ink') from the interface 102 into strokes.

An output 211 of the preprocessing module 200 is coupled to the beam search module 204 to indicate to the beam search module the length, T, of an ink sequence in terms of a total number of vectors in the ink sequence.

Figure 6:
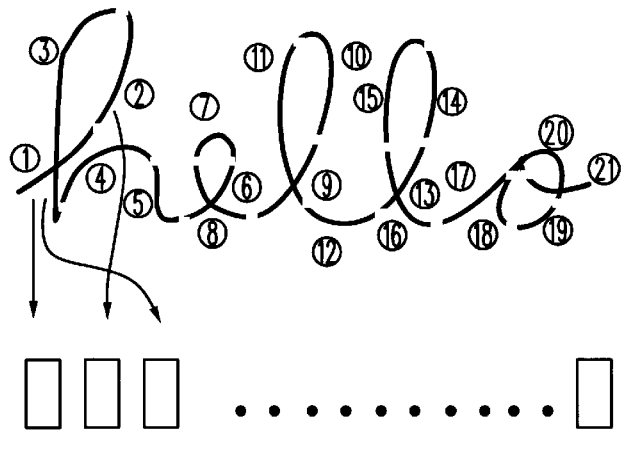
FIG. 6 illustrates an output of a preprocessing module of FIG. 5 and an input of a character recognition module of FIG. 3.

This segmentation process is illustrated in FIG. 6. The exact manner of segmentation of the ink into strokes is not important to the invention. A suitable manner of segmentation is a process of segmentation at points of maximum local curvature. Other methods of segmentation may be used. The preprocessing module 200 delivers vectors at output 201, where each vector defines a stroke according to a number of stroke parameters. The exact nature of the stroke parameters is not important to the invention. By way of example, a stroke may be parameterized by its length, its average curvature and its angle. The angle of a stroke may be measured by the angle of a midpoint or may be measured by the angle of a straight line joining the ends of the stroke. These details are not significant to the overall invention. Different methods of parameterization of strokes are described in U.S. Pat. No. 4,972,496, which also describes segmentation into strokes. That patent is incorporated herein by reference.

Each vector in FIG. 6 can be considered a "time step" for the purpose of analogizing to search processes derived form the field of speech recognition. Where references are made in this description to "time" and "time steps", these are not references to real-time, but to steps forward in the ink, e.g., segments or vectors. The search module 204 steps forward from time step to time step when all necessary scores for a given time step have been calculated by the character recognition module 202 and all theories active in the search module 204 have been scored by the character recognition module 202.

Figure 7:
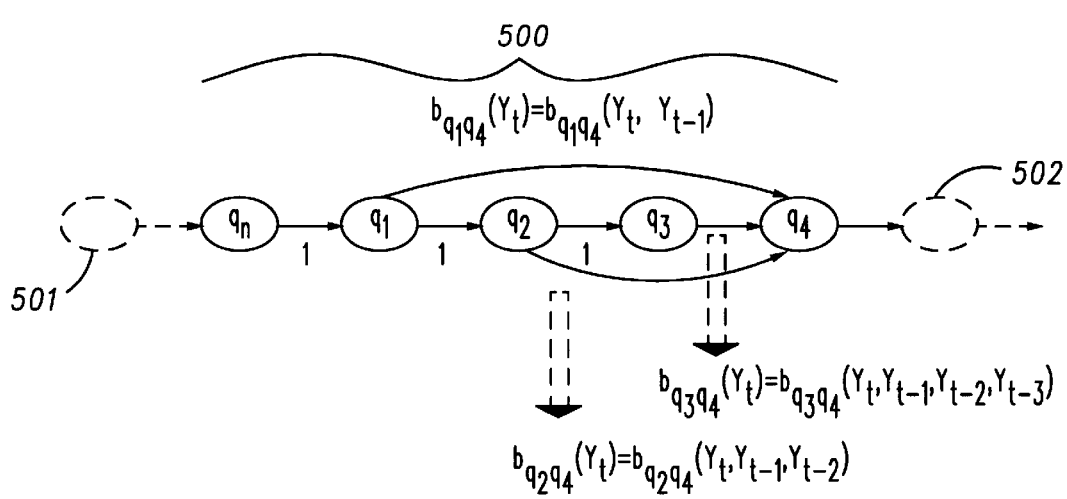
FIG. 7 is an example of a 5-state character model for illustration of operation of the recognizer of FIG. 4.

In FIG. 7 an example of one possible finite-state diagram for a character model in the non-cumulative character recognition domain is shown. The figure shows a 5-state character model 500 connected on the left and right to other models 501 and 502. In this character model, the transition probabilities $a_{q_i q_j}$ and emission probabilities $b_{q_j}(y_t)$ of the HMM-based models are combined into a single probability $b_{q_i q_j}(y_t) = b_{q_i q_j}(y_t, y_{t-1}, \ldots, y_{t-i})$. We use this notation to make explicit that scores $b_{q_i q_j}(y_t)$ can only be computed when the stroke sequence $y_{t-i}, \ldots, y_{t-1}, y_t$ is complete and available to the character recognizer. The shortest input vector sequence that this model matches is two and the longest one is four. That is, the character recognizer refuses to score this character when there are less than two or more than four stroke vectors in the scoring query. This is in contrast with the HMM-based phone modeling where there is, in theory, no upper limit on the length of the input vector sequence that a model can match.

Note that $b_{q_i q_j}(y_t)$ is set to be equal to 1 for some arcs $(q_i, q_j)$ to maintain the validity of Eq. 4. In practice, however, the character recognizer does not return a score in these cases. With this interpretation of the operation of a non-cumulative character recognizer, Eq. 4 can be used to compute P(Y|W) by finding the most probable path of length T, Q=$q_0 \ldots q_T$, through the states of the given $$P(Y \mid W) \sim \operatorname*{Max}_{Q} \prod_{t=1}^{T} b_{q_{t-1} q_t}(y_t) \tag{5}$$

Figure 8:
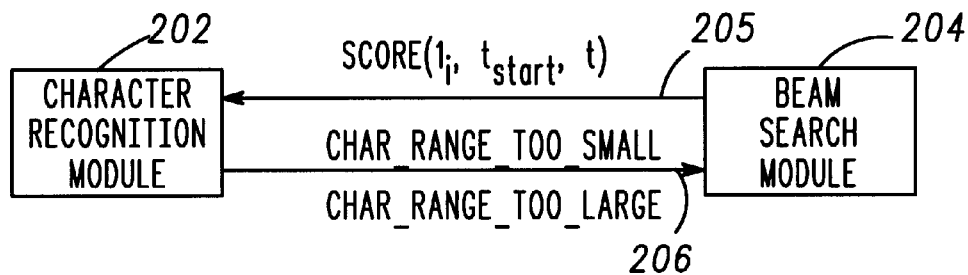
FIG. 8, FIG. 9, and FIG. 10 illustrate interaction of the character recognition module and the beam search module of FIG. 5 in different stages in the recognition process.
Figure 9:
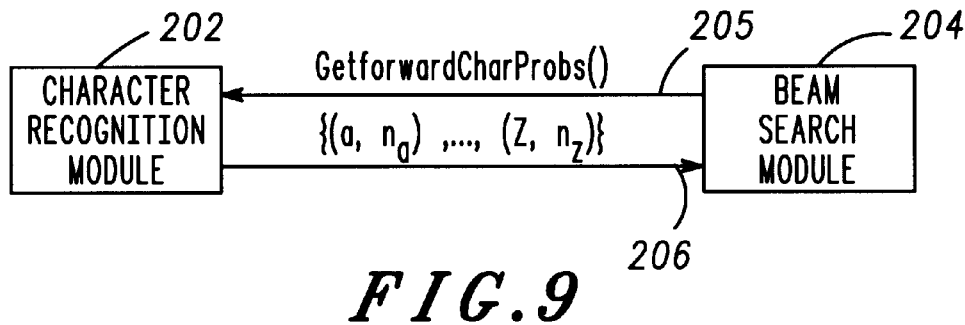
Figure 10:
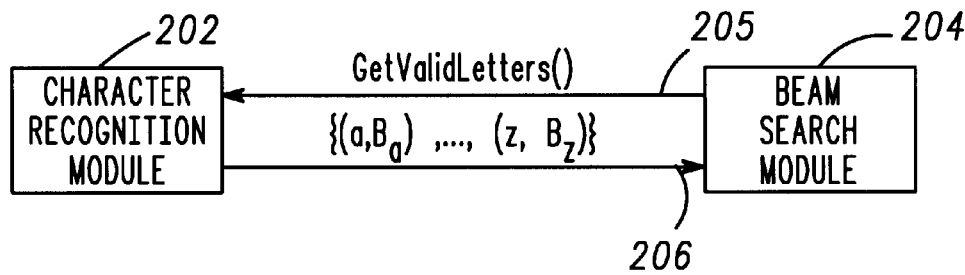

This embodiment adds to the standard search-recognizer interface the following protocol that allows to keep the size of the search space manageable despite the non-cumulative nature of the character scores (see FIGS. 8, 9, and 10).

CHAR_RANGE_TOO_SMALL: this is a message sent by the character recognition module 202 in response to a request of the search module 204 to score a theory for which there is not enough ink (not enough stroke vectors). Referring to the character model of FIG. 7, the shortest path through the model is of length two. Therefore, requests to score this model with less than two strokes are refused, along with an instruction to skip further evaluation of the theory until the next time step.

For example, an "M" in the input ink might typically generate the four following strokes: "|", "544", "/", and "|"; the recognizer module 202 would thus return this message when asked to score an "M" with less than two strokes.

CHAR_RANGE_TOO_LARGE: this is a message sent by the character recognition module 202 in response to a request of the search module 204 to score a theory for which there is too much ink; it indicates to the search that the theory can be safely destroyed. Referring again to the character model of FIG. 7, the longest path through the model is of length four. Therefore, requests to score this model with more than four strokes can be refused, along with an instruction to destroy the theory.

Letter 'i', for example, almost never contains more than two strokes, and so requests with three or more strokes can be refused.

GET_FORWARD_CHAR_PROBS: this is a method implemented in the character recognition module and which is called by the search module 204 during the propagate stage to query the recognizer for "look-ahead" scores. In this method probabilities are computed for all characters some distance ahead of the current search point. The maximum forward probability is then found for each character type. That is:

$$\text{Look\_Ahead}(l_i) = \operatorname*{Max}_{\Delta, q_i, q_j} b_{q_i q_j}(y_{t+\Delta}) \qquad q_i, q_j \text{ are states in } a \text{ model}$$

for $l_i$, started at time $t$ $$= \operatorname*{Max}_{\Delta} Score(l_i, t, t + \Delta)$$

This gives the search module 204 an upper bound on the possible score for any theory it might propose. The standard search algorithm is extended so that when the search module 204 is deciding whether to create a new theory, it takes the score of the theory's parent, multiplies in a look-ahead score to obtain a ceiling probability for the new theory, and then compares that ceiling probability to a threshold to decide whether to create the theory.

In general, the creation of new theories is controlled by allowing a certain fixed number of parents to propagate children at each time step. By using the parent score and the forward character probability to estimate a best case outcome for a theory before creating it, as many of the most likely theories as desired can be propagated. A preferable limit is 50 parents propagating children at any time, creating about 200 descendants at any given time step (where a time step is not a real-time step but a step forward from one ink segment to the next).

Get Valid Letters: this is a method implemented in the character recognition module 202 and which is called by the search module 204 during the scoring phase. In this method, the character recognition module determines which letters can potentially end at the current time step. More precisely, letters $l_i$ for which Score($l_i$, $t_{START}$, t) can be established to be zero, for all possible values of $t_{START}$, are said to be invalid during the current time step t. The search module 204 then skips further evaluation of all theories associated with letters marked as invalid, until the next time step.

A key insight here is that models are not evaluated in order to determine which letters are invalid, but rather the decision is made based on properties of the current stroke vector $Y_t$.

The most common instance of this scenario occurs at "pen-up" strokes (i.e., pen-movements made when the pen is not touching the paper). The only character that the recognizer 202 considers valid at a pen-up stroke is the "space" character. Invoking Score( ) for any other letter would be a waste of time.

Using this extended interface, the inventors have succeeded in combining a beam search with either one of two different stroke-based non-cumulative character recognition modules into a system that achieves both high accuracy and speed in the recognition of on-line unconstrained handwriting.

Figure 12:
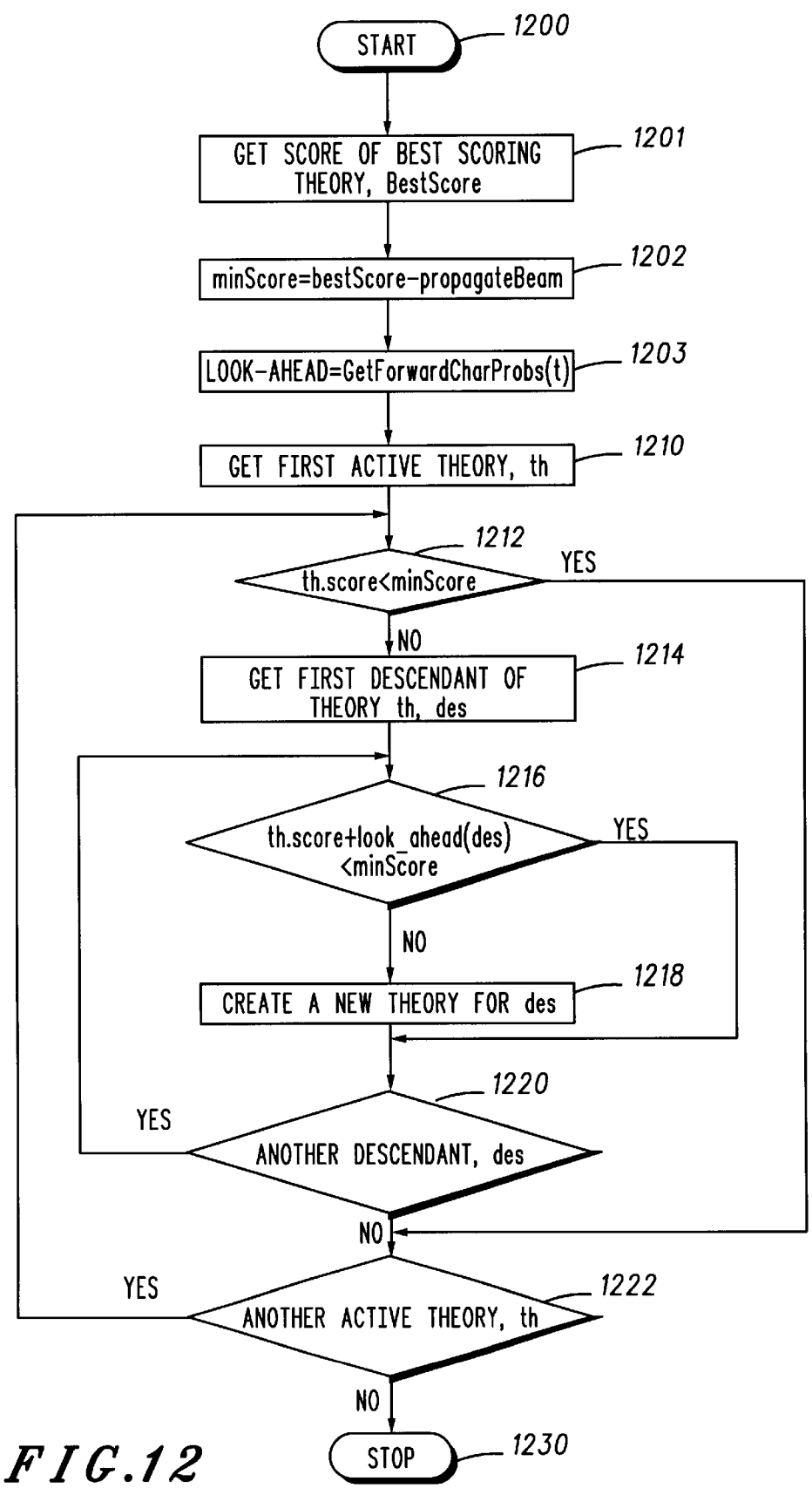
FIG. 12 is a flow diagram illustrating the propagate routine of FIG. 11.
Figure 13:
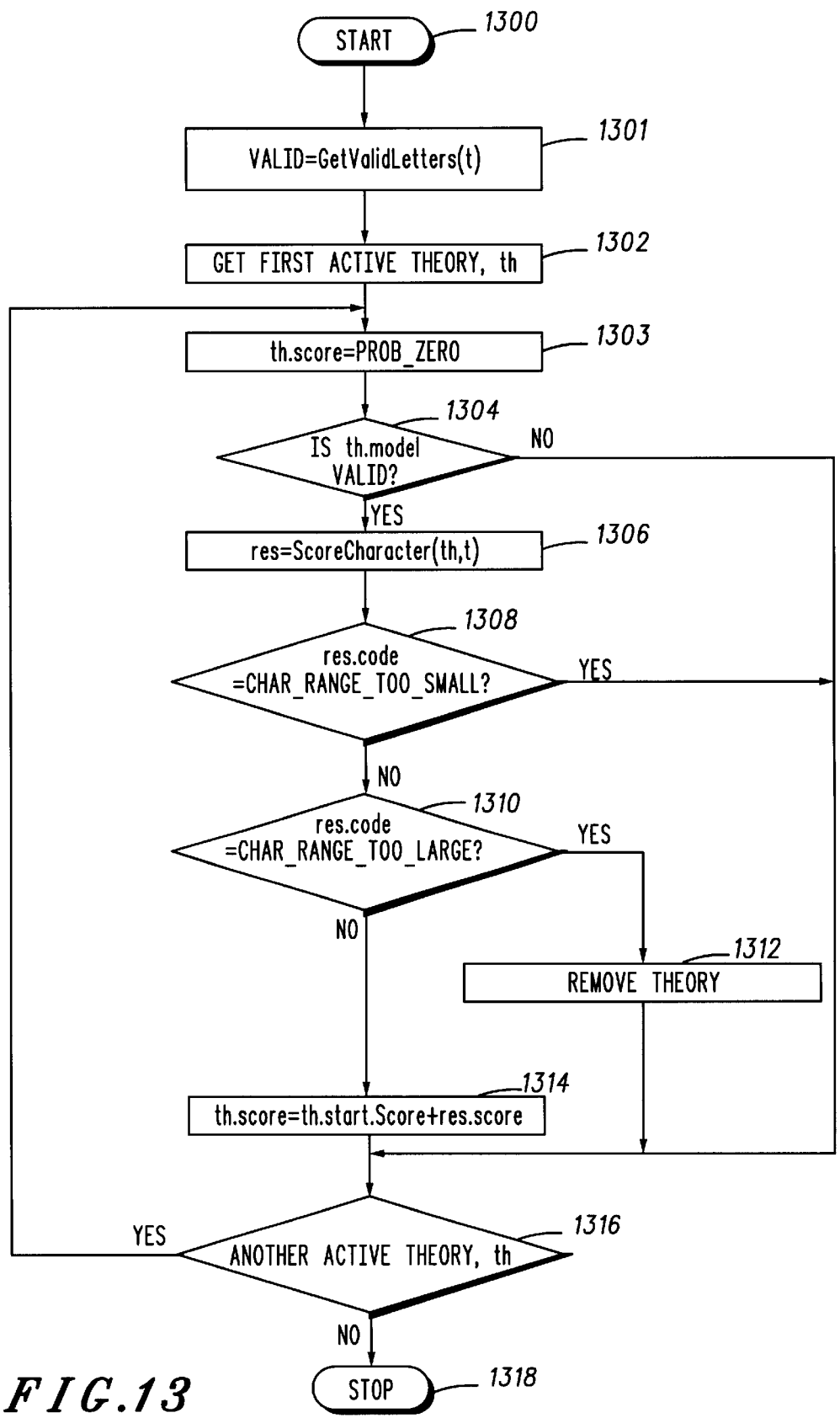
FIG. 13 is a flow diagram illustrating the scoring routine of FIG. 11.

Having described the forward search module 204 and the character recognition module 202 and the novel commands passes there between, the process performed by the extended beam search module 204 is now described in greater detail. In the description that follows all scores are assumed to be in the logarithmic domain. The process is illustrated in FIGS. 11–13 and is preferably implemented in a software program of instructions and data loaded into the processor 103.

Figure 11:
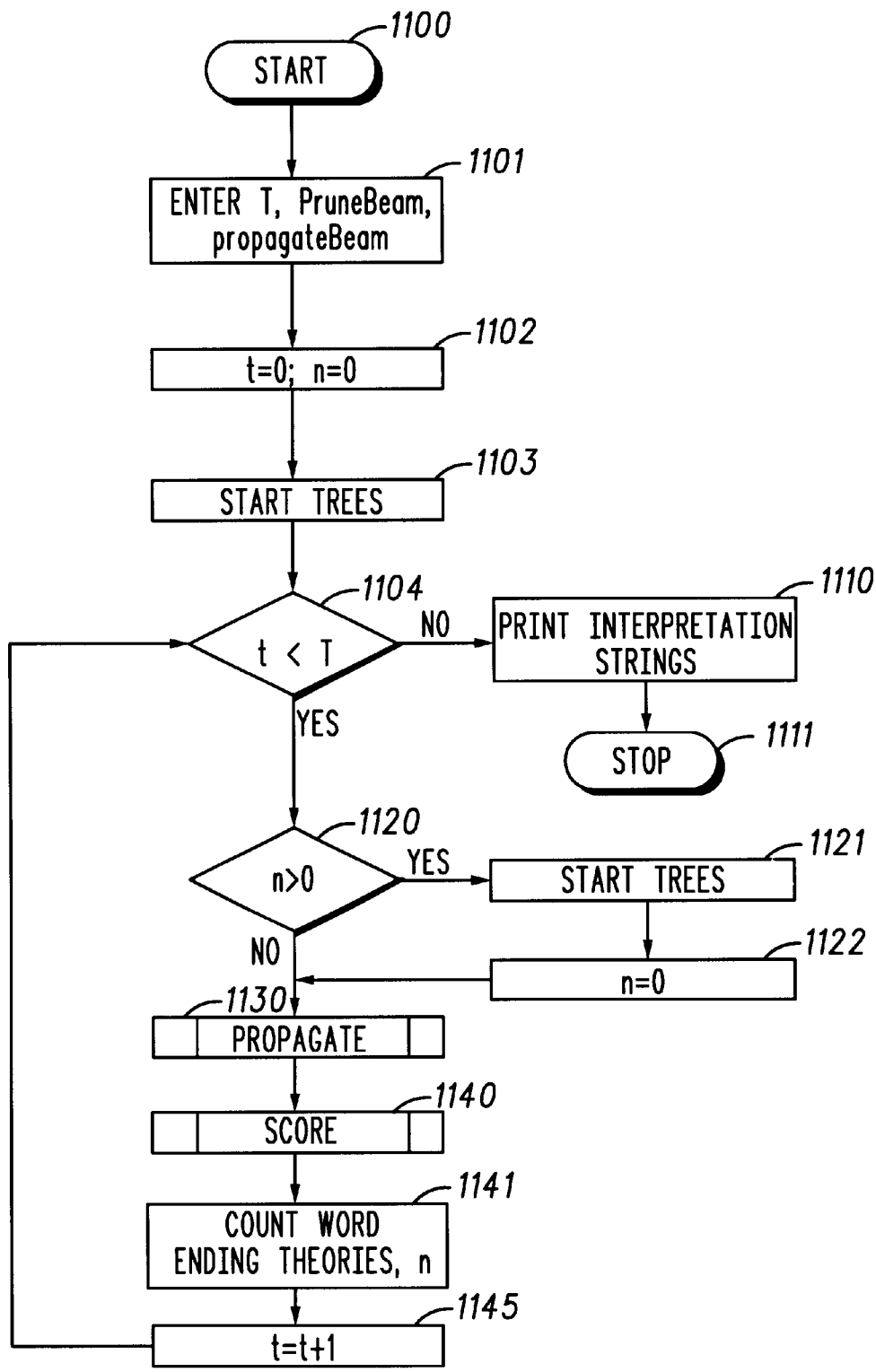
FIG. 11 is a flow diagram illustrating the overall search routine.

FIG. 11 shows the overall search routine. It begins at step 1100, and at step 1101 the total number (T) of input vectors in the input vector sequence is determined by the preprocessing module 200 and entered into the search module 204. At step 1102, the variables t (a vector count) and n (the number of current word ending theories) are set to zero. At step 1103, a subroutine "Trees" is performed, in which a theory is created for every branch of the root node in the dictionary tree for the dictionary 210. A representation of each theory is temporarily stored in memory 105. Step 1104 tests for the condition t<T, i.e. the condition where all vectors of the ink have been searched. If t is not less than T (i.e. when the count vector is equal to T), the search routing passes to step 1110 and the interpretation strings found by the search are "printed", i.e. output, for example to the display 104. (In the preferred embodiment, only the top scoring predetermined number of interpretation strings are displayed on display 104.) In such a case, the routine stops at step 1111, to be restarted at step 1100 for the next sequence of vectors (e.g., if the user decides to write some more ink).

If the test of step 1104 is negative (as is the case with all vectors up to the last vector), the routing continues to step 1120. Step 1120 tests for the condition n>0. If n is greater than zero (i.e. there are one or more word ending theories at the current vector), the routine Trees is started again at step 1121 and n is reset to zero again at step 1122. The effect of step 1121 is to treat the current vector as a new root node in the dictionary tree, so as to begin searching for a new word following the word which is represented by the word ending theory.

Following step 1120 or step 1122, a propagate routine 1130 is commenced, followed by a score routing 1140. These routines are illustrated and described in detail with reference to FIGS. 12 and 13. After score routine 1140, the number of word ending theories is counted and the variable n is set to this count value. Finally, the vector count t is incremented in step 1145 and steps 1104–1141 are repeated until the vector count value t is equal to T and the interpretation strings from the search are output at step 1110.

Note that there is no pruning routine in FIG. 11. The inability to prune low-scoring theories (because a low scoring theory may instantly become a high scoring theory at the next vector as shown in FIG. 6) means that the number of theories can explode and the processing load will be very large if steps are not taken in the propagate and score routines 1130 and 1140, as are now described.

Referring, therefore, to FIG. 12, the propagate routine 1130 is illustrated. The routine starts at step 1200 and at step 1201, the score ("bestScore") of the best scoring theory is identified and in step 1202 a minimum score ("minScore") is set to be a predetermined level ("propagateBeam") of score below the best score. This in effect sets a beam width for the search module.

Following step 1202, the character recognition module 202 is called for the look-ahead scores, as described with reference to FIG. 9. A set of parameters "look-ahead" is set to the retrieved value for each character. Now the routine is ready to begin the task of propagating children and the first active theory (th) is fetched from the memory 105 at step 1210. In step 1212, if the score of the theory falls below the threshold minScore (i.e. is outside the width of the beam), the process skips down to step 1222 for the next theory. If the score is within the range of scores permissible, step 1214 identifies (using the dictionary) the first descendant of theory th. This is labeled des.

If, in step 1216, the sum of the score for the theory and the look-ahead value for the descendent (des) is less than the minimum acceptable score (minScore), the process skips down to step 1220. Otherwise, a new theory for des is created in step 1218. Note that the scores themselves are probabilities in the range 0–1, so that the values being compared (in the logarithmic domain) in steps 1212 and 1216 are negative values. Note that step 1216 reduces the propagation of child hypotheses.

By means of step 1220, steps 1216–1218 are repeated for each potential descendant, until step 1220 determines that all potential descendants are exhausted, whereupon the routine proceeds to step 1222. From step 1222, flow returns to step 1212 if there are more theories for which possible descendants need to be spawned. When there are no more theories, the subroutine ends at step 1230 and control returns to the main search routine.

Referring finally to FIG. 13, the scoring routine starts at step 1300, and at step 1301 the character recognition module 202 is called to determine valid ending letters. In step 1302, the first active theory from memory 105 is fetched and in step 1303 the score for this theory is reset to PROB_ZERO (a value that represents log(0)). In step 1304, a determination is made as to whether the theory is valid, by reference to the valid letters identified by the recognition module at step 1301. If the theory is not valid, the process skips to step 1316.

If the theory is valid (i.e., there is no property of the current stroke vector $Y_t$ that renders the theorized letter invalid), the recognition module 202 scores the theory in step 1306 at which a set of variables "res" is delivered for the character associated with the given theory (th) ending at the present time step (t). The set of variable "res" includes res.score, being the score for the character and (optionally) res.code, being either a code for CHAR_RANGE_TOO_SMALL or a code for CHAR_RANGE_TOO_LARGE. In the course of scoring the character theory in step 1306, the character recognition module 202 will deliver the results CHAR_RANGE_TOO_SMALL or CHAR_RANGE_TOO_LARGE if there is insufficient ink or too much ink for the selected character. In the former case, step 1308 causes the process to skip to step 1316. In the latter case, step 1310 causes the process to skip to step 1316 after removing the theory in step 1312. Step 1312 weeds out old theories, reduces consumption of memory 105, and eliminates further processing of obsolete theories.

If the quantity of ink being scored is neither too large nor too small, step 1314 is reached and a new score for the theory (th.score) is calculated, being the cumulative sum of the scores for the theory so far plus the new character score res.score. The scoring of theories is cumulative (although the scores within the character recognizer are not), because each theory is the concatenation of individual, discrete characters.

After step 1314, the process repeats from step 1303 for the next theory, until step 1316 determines that all the existing or surviving theories have been scored. Then the process ends at step 1318 and flow returns to step 1141 of FIG. 11 to be repeated for the next stroke vector.

In summary, a more efficient handwriting recognizer has been described, capable of being run in software on a small microprocessor with limited memory. The arrangement described employs a forward search technique and combines it with a character recognizer that provides non-cumulative scores. The recognizer delivers to the search module a result that is either the score for a selected character hypothesis or a result that allows the search module to temporarily ignore the hypothesis or to kill it altogether. The search module maintains or disregards a current hypothetical character string dependent on the result.

Thus, the invention is able to benefit from all the advances in forward searching techniques developed in the speech recognition field and applies these benefits to the field of handwriting recognition. Various techniques have been described and claimed which keep the size of the search space manageable.

The above description has been given by way of example only, and modifications of detail can be made within the scope and spirit of the invention.

We claim:

1. A text recognizer comprising a non-cumulative character recognition module for providing an indication of the likelihood that a given character is present in a handwritten input at a position starting at a start vector and ending at an end vector, the recognition module coupled to a forward search module to enable multiple parallel non-cumulative scores to be delivered from the character recognition module to the search module, wherein the character recognition module has means for delivering a first out-of-range message to the forward search module indicative of an inability to score a handwriting recognition theory in response to a request from the forward search module defining a selected character theory which encompasses insufficient number of stroke vectors for a character recognition operation to be completed.

2. The text recognizer of claim 1, wherein the forward search module has means for temporarily skipping further evaluation of the selected character theory in response to receipt of the first out-of-range message.

3. The text recognizer of claim 1, wherein the character recognition module has means for delivering a second out-of-range message to the forward search module in response to a request from the forward search module defining a selected character theory that encompasses a number of stroke vectors that is in excess of a predetermined limit for the selected character theory.

4. The text recognizer of claim 3, wherein the forward search module has means for pruning the selected character theory in response to receipt of the second out-of-range message.

5. The text recognizer of claim 1, wherein the character recognition module has means for receiving a request from the forward search module, including a value indicative of a position in an ink stream, means for computing probabilities for a plurality of characters in the ink stream forward of that position and means for delivering to the search module a look-ahead value equivalent to a maximum of those probabilities.

6. The text recognizer of claim 5 wherein the search module has decision means, responsive to the look-ahead value from the character recognition module, for deciding whether to propagate a new theory.

7. The text recognizer of claim 1, wherein the character recognition module has means for receiving a request from the forward search module, including a value indicative of a position in an ink stream, and the recognition module has means for providing to the search module an invalid character list, indicating characters rendered invalid by virtue of a property of the position in the ink stream.

8. The text recognizer of claim 7, wherein the search module has means for temporarily skipping further evaluation of all theories associated with characters of the received invalid character list.

9. A method of recognition of handwritten input comprising:
segmenting the handwritten input into strokes in a preprocessing module, to provide stroke vectors;
delivering one or more out-of-range messages based on the number of provided stroke vectors;
creating a first hypothetical character string in a search module;
creating a first character hypothesis in a search module, the first character hypothesis being a first data set comprising a first character, a first start vector and a first end vector, wherein the first character is a member of the first hypothetical character string;
requesting, from the search module to a character recognition module, a non-cumulative score for the first character hypothesis, where the score represents a likelihood of the first character being present in the handwritten input at a position starting at the start vector and ending at the end vector;
delivering upon request from the character recognition module to the search module multiple Darallel non-cumulative scores for the first character hypothesis; and
selectively maintaining the first hypothetical character string dependent on the scores.

10. The method of claim 9, comprising a step of creating sets of multiple character hypotheses and multiple hypothetical character strings in the search module and requesting multiple scores for the multiple character hypotheses from the character recognition module, wherein numbers of character hypotheses and hypothetical character strings created are constrained by a beam width which is bounded by a range of scores permissible below a maximum score.

11. The method of claim 9, comprising a further step of spawning, for a given selected first character hypothesis, a child character hypothesis which is an expansion of the first hypothetical character string and which comprises a second character hypothesis being a second data set comprising a second character, a second start vector and a second end vector.

12. The method of claim 11, wherein the child character hypothesis is spawned only when the score for the first character hypothesis exceeds a predetermined threshold.

13. The method of claim 9, comprising delivering an out-of-range message from the character recognition module to the search module in response to a request from the search module defining a selected character hypothesis that extends over a number of vectors in excess of a predetermined limit for the selected character hypothesis.

14. The method of claim 13 further comprising pruning the selected character hypothesis in response to receipt of the out-of-range message.

15. The method of claim 14, wherein the selected character hypothesis identifies a selected character and the predetermined limit is dependent on the selected character.

16. A handwriting recognizer comprising:
a digitizer having a surface for receipt of handwritten input, and having an output;
a preprocessor coupled to the output of the digitizer, the preprocessor segmenting the handwritten input into strokes to provide stroke vectors, the processor further delivering an out-of-range message based on the number of provided stroke vectors;
a character recognizer coupled to the preprocessor and operative on the stroke vectors, the character recognizer having an input receiving scoring requests and an output providing non-cumulative scores; and a forward search module coupled to the input and the output of the recognizer, the forward search module adapted to deliver multiple non-cumulative scores to the recognizer to enable the recognizer to form multiple parallel hypotheses regarding the identity of the input ink.

17. A recognizer according to claim 16, further comprising a memory coupled to the search module, wherein the memory has a dictionary of words stored therein.

18. A method of recognition of handwritten input comprising:
  (a) segmenting the handwritten input into strokes in a character recognition module, to provide stroke vectors;
  (b) creating a first hypothetical character string in a search module;
  (c) creating a first character hypothesis in the search module, the first character hypothesis being a first data set comprising a first character, a selectable start vector and a selectable end vector, wherein the first character is a member of the first hypothetical character string;
  (d) requesting, from the search module to the character recognition module, a score for the first character hypothesis, where the score represents a likelihood of the first character being present in the handwritten input at a position starting at the start vector and ending at the end vector, the request from the search module optionally enabling multiple parallel non-cumulative scores to be delivered from the recognition module;
  (e) delivering from the character recognition module to the search module a score for the selected first character hypothesis;
  (f) repeating steps (c), (d) and (e) for further character hypotheses, including hypotheses corresponding to data sets comprising the first character, the selectable start vector and alternative end vectors;
  (g) selectively maintaining the first hypothetical character string dependent on the score; and
  (h) delivering an out-of-range message based on the number of provided stroke vectors and preventing the return of the score if an out-of-range message is delivered.

* * * * *

UNITED STATES PATENT AND TRADEMARK OFFICE
CERTIFICATE OF CORRECTION

PATENT NO. : 6,285,786 B1
DATED : September 4, 2001
INVENTOR(S) : Seni et al.

It is certified that error appears in the above-identified patent and that said Letters Patent is hereby corrected as shown below:

<u>Claim 9,</u>
Line 22, change "Darallel" to -- parallel --

Signed and Sealed this

Ninth Day of April, 2002

Attest:

*Attesting Officer*

JAMES E. ROGAN
*Director of the United States Patent and Trademark Office*